Figure 1:
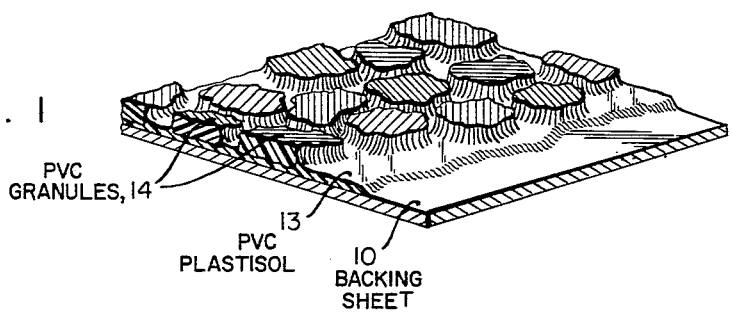

Oct. 6, 1964

R. WISOTZKY ETAL  3,152,002

PROCESS OF MAKING ELASTOMERIC FLOOR OR WALL
COVERING AND STEP PRODUCT THEREFOR

Filed Dec. 11, 1961  2 Sheets-Sheet 1

INVENTORS
REUBEN WISOTZKY
BEATRICE EDESESS

BY Kenway, Jenney & Hildreth
Att'ys.

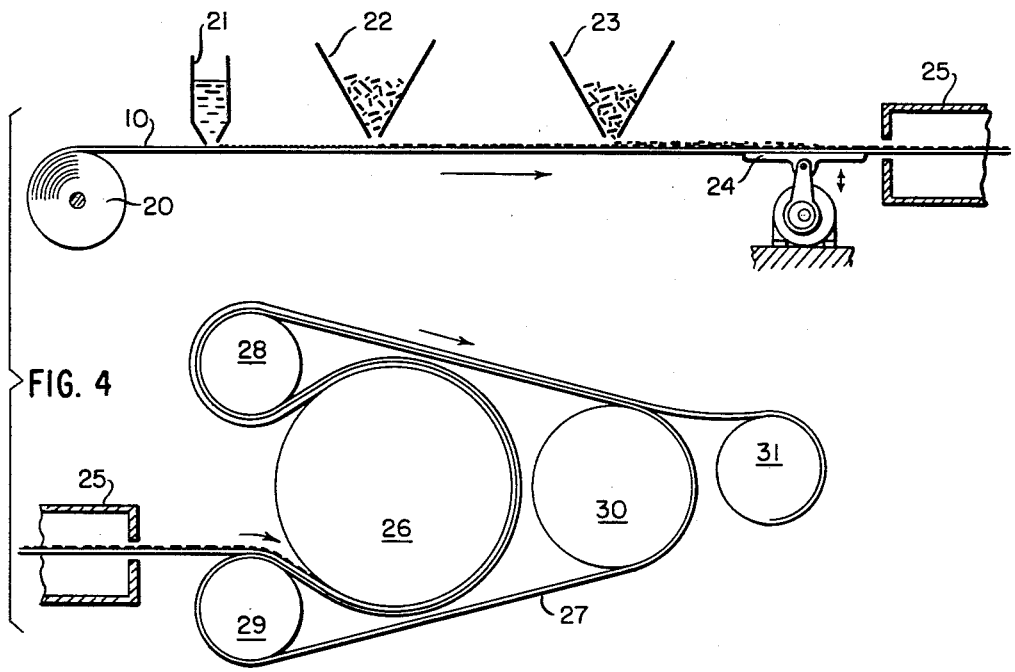
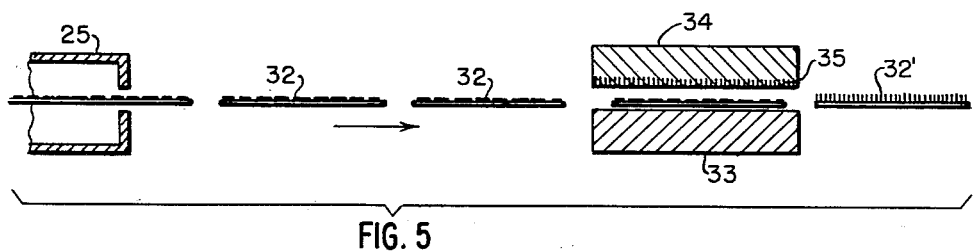

United States Patent Office 3,152,002
Patented Oct. 6, 1964

3,152,002
PROCESS OF MAKING ELASTOMERIC FLOOR OR WALL COVERING AND STEP PRODUCT THEREFOR
Reuben Wisotzky, Lexington, and Beatrice Edesess, Brookline, Mass., assignors to American Biltrite Rubber Co., Inc., Chelsea, Mass., a corporation of Delaware
Filed Dec. 11, 1961, Ser. No. 158,409
6 Claims. (Cl. 117—21)

The invention comprises a new and improved process of making elastomeric floor or wall covering of varigated color and of either terrazzo or pile type.

The process is characterized by the steps of coating a backing sheet with a liquid and preferably pigmented plastisol, distributing a layer of solid plastic granules upon the coated backing sheet and adhesively embedding the granules in the plastisol. The plastisol may then be partially cured or fused to fix the positions of the granules on the backing sheet thus forming a step product that may be stored for further treatment at convenient times or immediately subjected to heat and molding pressure which transforms the components thus assembled into a solid sheet.

This final step may be carried out between plane surfaces in producing terrazzo type of product; or alternatively with the assistance of a mold having a multiplicity of needle-formed closely spaced tubular passages into which the material of the granules and plastisol is forced by molding pressure to form needle-like filaments merging into a continuous body of elastomeric material on the backing sheet.

Important and unexpected advantages are realized from the step of adhesively embedding and fixing the position of the otherwise loose plastic granules in the plastisol coating of the backing sheet. The whole process may be carried out at a lower temperature than otherwise. It is possible to utilize granules of harder plastic composition since they do not require to be softened or rendered tacky by heat prior to the molding step. Moreover by the process of this invention solid granules of any desired size and shape—even fine plastic fibers—may be conveniently distributed and fixed in their position on the coated base sheet.

The novel process herein disclosed is a unique advance in producing the so-called "Vinatuft" rug product in which it is often desired to include needle-like filaments of different colors. In the procedure above outlined each granule will form filaments of its own color and various pleasing and ornamental patterns may be produced by judicious selection and placing of differently colored granules upon the coated backing sheet.

These and other features and advantages of the invention will be best understood and appreciated from the following description of a preferred manner of carrying out the process as suggested in the accompanying drawings, in which—

Figure 2:
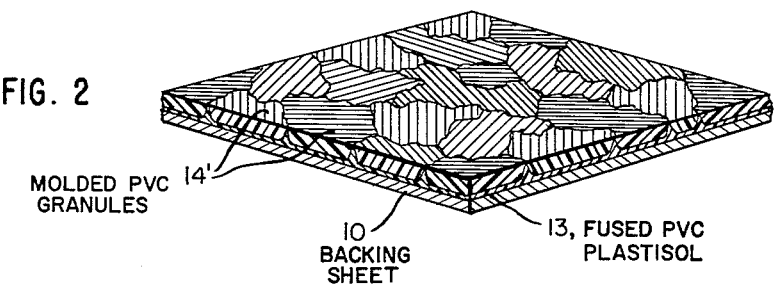
Figure 3:
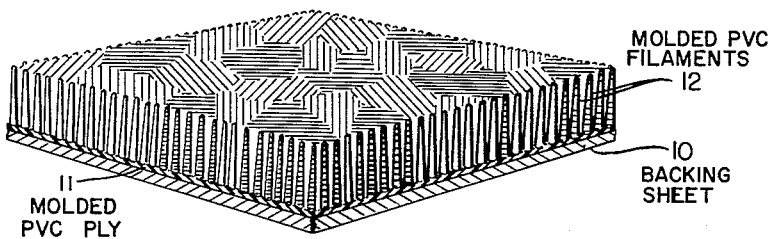

FIG. 1 is a fragmentary view showing different colored granules embedded in the plastisol coating of a base sheet, FIG. 2 is a fragmentary view of the resulting terrazzo type product, FIG. 3 is a fragmentary view of the "Vinatuft" type product, FIG. 4 is a diagrammatic view of apparatus for producing the terrazzo type product, and FIG. 5 supplements FIG. 4 in a diagrammatic view of apparatus for producing the "Vinatuft" type product.

In carrying out the novel process of my invention the required plastic granules may be prepared by mixing any suitable vinyl compound such as PVC (polyvinyl chloride) compound or the like in a Banbury mill, fusing and calendering it and then chopping the calendered sheet into solid granules of selected size, for example 0.060 thick by one-fourth inch on a side. The process permits a wide range of variation in the size of the granules as well as in their color and relative proportions in respect to both color and size.

One typical and satisfactory formula for compounding the granule material is as follows:

| | |
|---|---:|
| PVC resin | 100 |
| DOP plasticizer | 80 |
| Epoxy plasticizer | 10 |
| Pigment | 5 |
| Barium cadmium stabilizer | 2 |

Granules of different colors and sizes thus produced may be blended together at room temperature in forming the pattern desired in the finished product.

A pigmented liquid plastisal of the same chemical formula as the granules but unfused is now prepared by conventional procedure and suitable mixing equipment. A satisfactory and typical formula is as follows:

| | |
|---|---:|
| PVC resin | 100 |
| DOP plasticizer | 80 |
| Epoxy | 10 |
| Pigment | 5 |
| Barium cadmium stabilizer | 2 |

The foregoing formulae are merely typical of many vinyl compounds having satisfactory characteristics for purposes of the present invention.

A web of appropriate material for the backing sheet is now selected and coated with the liquid unfused plastisol. This may be of woven textile fabric, of paper stock or a calendered PVC sheet or the like. The coating of plastisol may vary in thickness from 4 mils to 50 mils.

The loose and unheated granules may now be supplied from a suitable hopper or hoppers which permit the granules to be advanced at a controlled rate on the surface of the coated backing sheet which is wet with the liquid plastisol. The solid granules as supplied are partially embedded in the plastisol coating and become wetted thereby so that they are no longer freely movable. The coated backing sheet is now passed through a heater in which the plastisol is fused and the embedded granules adhesively and permanently secured in place. After cooling, the backing sheet with its applied granules may be either cut into slabs or wound into a coil. In this condition it constitutes an important step product and may be stored for future treatment at a convenient time or subjected immediately to molding heat and pressure.

One or more hoppers for applying the granules to the plastisol coating can be so arranged as to deposit the granules in designs or patterns which run parallel or transverse or diagonal with respect to the direction of the coated backing sheet. If an excess of granules is deposited on the surface of the plastisol coated sheet means may be utilized to vibrate the sheet in such a way as to distribute the granules in a relatively uniform layer approximately one granule thick.

As suggested in FIG. 4 the backing sheet 10 is directed from a coil 20 and travels toward the right passing beneath a reservoir 21 of liquid plastisol and then beneath the hoppers 22 and 23 from which are delivered loose solid granules of different color, size or shape. After leaving the hopper 23 the backing sheet passes over and within operative range of a vibrating device 24 by which the granules are persuaded to assume a single thickness layer in the still liquid plastisol. Upon passing from the vibrator 24 the backing sheet is passed through a heater 25 where the plastisol is fused and solidified so that the embedded granules are permanently fixed in position therein.

If a terrazzo type of product is desired the backing sheet with its affixed granules is passed directly into a molding and curing machine of the well known "Rotocure" type. As shown in FIG. 4 this comprises a large heated drum 26 which is partially encircled by a steel pressure band 27 directed in a generally triangular path by rolls 28, 29 and 30. The prepared backing sheet is led to the bight of the drum 26 and band 27 and passes slowly about the drum under severe molding pressure and heat. The finished product is stripped from the pressure band and rolled upon a reel 31.

In FIG. 1 is shown a portion of the backing sheet 10 as provided with the plastisol coating 13 and granules 14, these being hatched to indicate different colors. It will thus be apparent that FIG. 1 indicates the step product as it emerges from the heater 25 of FIG. 4. In FIG. 2 the final product is indicated as it emerges from the Rotocure machine and in this figure the granules 14' have been molded and flattened to present the desired terrazzo effect. The plastisol has now been transformed into a solid matrix and may or may not appear at the surface between the molded areas of the granules 14'.

If a pile type of product is desired the backing sheet with its distributed and adherent granules may be divided into sections 32 on leaving the heater 25. These may then advance, one by one, as suggested in FIG. 5, to a press having heated cooperating flat platens 33 and 34. The upper platen carries a mold 35 having a multiplicity of closely spaced hollow needle-like tubes opening into its lower face.

When one of the sections 32 has been subjected to molding heat and pressure between the lower platen 33 and the mold 35 it emerges in the form of product shown in FIG. 3, that is to say, the backing sheet 10 is adherently bonded to a continuous ply 11 of elastomeric material which in turn merges into a multiplicity of upstanding solid needle-like filaments 12 arranged in groups of the different colors derived from the original granules whose shape and outline persists in the molded product.

Having thus disclosed our invention and described in detail a preferred manner of carrying it out, we claim as new and desire to secure by Letters Patent:

1. A process of making elastomeric terrazzo type flooring, comprising the steps of uniformly coating a sheet of textile backing material with an unfused liquid pigmented polyvinyl chloride plastisol, distributing a charge of loose unheated plastic granules of solid polyvinyl chloride compound upon the coated backing sheet and adhesively embedding them in said liquid plastisol, fusing the plastisol to fix the position of the otherwise loose granules on the backing sheet, and then by the application of heat and pressure, molding the components thus assembled into a flat product of uniform thickness.

2. A process of making elastomeric flooring of varigated color, comprising the steps of coating a sheet of backing material with a liquid polyvinyl chloride plastisol, delivering a charge of solid unheated plastic granules of polyvinyl chloride compound and different colors to the coated backing sheet, spreading the granules in a layer of substantially uniform thickness in the liquid plastisol, partially curing the plastisol to fix the position of the granules on the backing sheet, and then molding the components thus assembled into a product of the desired surface texture.

3. The process of making elastomeric flooring as defined in claim 2, further characterized in that the molding step is carried out with the assistance of a mold having a multiplicity of fine hollow tubes into which the granules are molded by the application of heat and pressure in producing groups of differently colored needle-like filament merging into a continuous body of elastomeric material on the backing sheet.

4. The process of forming an elastomeric floor covering by dropping loose unheated plastic granules of solid polyvinyl chloride compound into a polyvinyl chloride plastisol layer spread upon a backing sheet, subsequently fusing the plastisol and thereafter molding the granules and plastisol into a composite structure.

5. The process of making floor or wall covering of elastomeric composition, comprising the steps of applying a coating of liquid partially uncured polyvinyl chloride plastisol to a traveling backing sheet, distributing upon the plastisol-wet sheet differently colored solid granules of polyvinyl chloride from at least two different sources, wetting the granules in the liquid plastisol, fusing the plastisol to fix the otherwise loose granules therein, and then subjecting the elements thus assembled to molding pressure and heat.

6. A step product comprising a thin backing sheet, a fused ply of polyvinyl chloride plastisol bonded in face to face contact therewith, and a layer of discrete-unmolded colored granules of solid polyvinyl chloride composition embedded in the plastisol ply and adhesively fixed in position on the backing sheet thereby.

References Cited in the file of this patent

UNITED STATES PATENTS

| | | |
|---|---|---|
| 394,083 | Sears | Dec. 4, 1888 |
| 2,807,564 | Mitchell | Sept. 24, 1957 |
| 2,867,263 | Bartlett | Jan. 6, 1959 |
| 2,926,100 | Weigle et al. | Feb. 23, 1960 |
| 2,936,814 | Yakubik | May 17, 1960 |
| 3,000,764 | Zentmyer | Sept. 19, 1961 |
| 3,017,714 | Slosberg et al. | Jan. 23, 1962 |
| 3,038,828 | Yakubik | June 12, 1962 |
| 3,049,761 | Yakubik | Aug. 21, 1962 |